2,824,096
TRICYANOVINYLARYLENEAZOARYLENE COMPOUNDS

Richard E. Heckert, East Grandview, Va., assignor to E. I. du Pont de Nemours and Company, Wilmington, Del., a corporation of Delaware No Drawing. Application July 13, 1954
Serial No. 443,143

5 Claims. (Cl. 260—192)

This invention relates to nitrogen-containing compounds: particularly, colored cyano-substituted azo compounds useful as dyes.

C-tricyanovinyl-substituted aromatic compounds especially useful in dyeing because of their intense color are described in Heckert patent applications, Serial No. 382,857, now abandoned, and Serial No. 382,860, now U. S. Patent No. 2,762,810, issued September 11, 1956, both filed September 28, 1953. Mentioned there are various auxochrome-substituted tricyanovinylaryl compounds ("auxochrome" having its usual chemical connotation of a substituent group capable of augmenting the action of chromophoric groups in producing color in organic compounds). Chemical compounds of that type provide a convenient point of departure for the present invention.

An object of the present invention is the provision of a novel class of compounds. Another object is the preparation of a new group of dyes. Other objects will be apparent from the following description of the invention.

The objects are accomplished according to this invention by providing tricyanovinylaryleneazoarylene compounds of formula

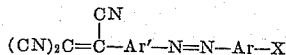

in which Ar and Ar' are carbocyclic aromatic radicals and X is hydroxyl or amino (primary, secondary, or tertiary). The carbon atoms of these radicals, herein called generally "arylene", can be unsubstituted or can carry (in place of hydrogen) hydrocarbon radicals or auxochrome radicals, such as —halogen, —NRR', —NHR, —NH$_2$, —OR, —OH, —SO$_3$H, and —COOH, where R and R' are hydrocarbon radicals. Preferably, these compounds are formed through diazotization of a C-tricyanovinyl-substituted aromatic compound that also has a primary amino substituent. The invention further comprises preparation of C-tricyanovinylaryleneazoarylene compounds by reacting a diazonium derivative of a C-tricyanovinylarylamine with a compound of formula ArX in which Ar is an aryl radical that can be hydrocarbon-substituted or auxochrome-substituted, carrying also replaceable hydrogen on the ring with X, which itself is a hydroxyl or amino radical, as above.

Diazotization is accomplished readily in conventional manner. A selected primary amino, C-tricyanovinyl-substituted aromatic compound is placed in acidic aqueous medium containing a suitable diazotizing agent, such as nitrous acid or nitrite. Any excess of such agent remaining after the reaction may be discharged, as by adding sulfamic acid or urea; the resultant tricyanovinylarylenediazonium derivative usually is left in solution preparatory to the coupling reaction.

Coupling to the diazonium derivative is carried out in solution, usually that prepared above, by addition of any chosen aromatic amine or phenol having a replaceable hydrogen located on the amino- or hydroxy-substituted ring; alternatively, it may be conducted in aqueous solution buffered to pH of from 4 to 11. The corresponding C-tricyanovinylaryleneazoaryleneauxochrome compound forms as a precipitate and is recovered by filtration, washing, and drying. Preparation of this novel class of compounds is exemplified below with, as starting materials, tricyanovinylarylamines prepared according to the teachings of the above Heckert patent applications. Unless otherwise stated, all parts are by weight in these examples.

EXAMPLE I 4-tricyanovinyl-2,6-dimethylaniline, 10 parts, is dissolved in 200 parts of glacial acetic acid containing 10 parts of concentrated sulfuric acid with stirring at room temperature. Sodium nitrite, 5 parts dissolved in 10 parts of water, is added gradually over thirty seconds. The color of the solution changes from red to yellow. The solution is stirred five minutes at room temperature (25° C.), and sulfamic acid, 5 parts dissolved in 100 parts of water, is added gradually to decompose excess nitrous acid. A small amount of suspended material is removed by filtration. The diazonium solution is added to a solution of 22 parts of beta-naphthol in 600 parts of 50% alcohol containing sodium acetate trihydrate. The mixture is stirred thirty minutes, and the precipitate is collected on a filter. This 1-(4-tricyanovinyl-2,6-dimethylphenylazo)-2-hydroxynaphthalene is suspended in 500 parts of hot alcohol, collected on a filter, and washed with a fresh alcohol. The air-dried solid, whose probable structure appears below, weighs 12 parts (71%). Analysis of it for nitrogen gives (two runs) 17.02% and 17.18% (calculated for $C_{23}H_{15}N_5O$: 18.6%). Formula of the product:

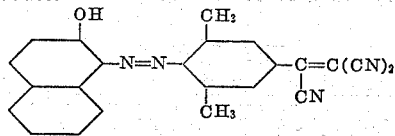

EXAMPLE II

A solution of diazotized 4-tricyanovinyl-2,6-dimethylaniline is prepared as described in Example I. N,N-dimethyl-alpha-naphthylamine (40 parts) dissolved in 300 parts of ethanol is added to the diazonium solution, followed by 30 parts of sodium acetate trihydrate dissolved in 150 parts of water. The mixture is stirred thirty minutes, and the solid precipitate is collected on a filter. The air-dried 1-(4-tricyanovinyl-2,6-dimethylphenylazo)-4-N,N-dimethylaminonaphthalene weighs 17 parts (93%). A sample for analysis is slurried with hot alcohol and is collected on a filter and washed on the filter with additional alcohol.

*Analysis.*—Calculated for $C_{25}H_{20}N_6$: N, 20.8%. Found: N, 20.49%, 20.45%.

Formula of the product:

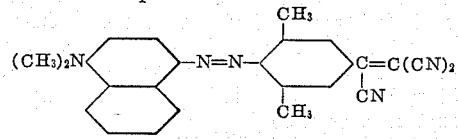

The colored compounds of these first two examples dye cellulose acetate skeins red and orange-yellow, respectively. As shown in Table I below, the exemplified preparation procedure, repeated with various tricyanovinylarylamines and aromatic coupling compounds, gives the following tricyanovinylazo dyes:

A. 1-(4-tricyanovinylphenylazo)-4-hydroxybenzene
B. 3 - (2 - tricyanovinylphenylazo) - 4 - amino - 5 - hydroxy-1-naphthalene sulfonic acid
C. 1 - (4 - tricyanovinylnaphthylazo) - 3 - methoxy - 4 - (N-methylamino)benzene
D. 1 - (4 - tricyanovinylanthrylazo) - 3 - chloro - 4 - (N, N-diethylamino)benzene

Table 1

| Product | Formula | Components | |
|---|---|---|---|
| | | Tricyanovinylarylamine | Coupling Compound |
| A | $C(CN)_2=C(CN)-\text{C}_6\text{H}_4-N=N-\text{C}_6\text{H}_4-OH$ | $C(CN)_2=C(CN)-\text{C}_6\text{H}_4-NH_2$ | $\text{C}_6\text{H}_5-OH$ |
| B | $\text{C}_6\text{H}_4(-N=N-\text{naphthyl}(NH_2)(OH)(SO_3H))$ with $C(CN)_2=C(CN)-$ substituent | $C(CN)_2=C(CN)-\text{C}_6\text{H}_4-NH_2$ | naphthyl with $NH_2$, $OH$, $SO_3H$ |
| C | $C(CN)_2=C(CN)-\text{C}_6\text{H}_4-N=N-\text{C}_6\text{H}_3(OCH_3)-NHCH_3$ | $C(CN)_2=C(CN)-\text{C}_6\text{H}_4-NH_2$ | $\text{C}_6\text{H}_3(OCH_3)-NHCH_3$ |
| D | $C(CN)_2=C(CN)-\text{C}_6\text{H}_4-\text{C}_6\text{H}_4-N=N-\text{C}_6\text{H}_3(Cl)-N(C_2H_5)_2$ | $C(CN)_2=C(CN)-\text{C}_6\text{H}_4-\text{C}_6\text{H}_4-NH_2$ | $\text{C}_6\text{H}_3(Cl)-N(C_2H_5)_2$ |

The 4-tricyanovinylaniline appearing in the above table may be prepared as in the first paragraph of the following example.

EXAMPLE III p-Aminobenzalmalononitrile, 100 parts, is stirred at room temperature in 189 parts of dimethylformamide, and 35 parts of sodium cyanide dissolved in 50 parts of hot water is added in one portion. The reaction proceeds rapidly and exothermically to give a dark yellow solution. The solution is stirred for two minutes and is acidified with 420 parts of glacial acetic acid. Lead tetraacetate, 280 parts, is added gradually over a period of three minutes so that the maximum temperature of the resulting red solution is 75–85° C. The solution is stirred 10 minutes, cooled in ice water, and 200 parts of water is added very slowly. (It is convenient to seed the reaction mixture before adding the water if a sample of the crystalline 4-tricyanovinylaniline is available.) The mixture is stored at 2–5° C. overnight, and the crystalline precipitate of 4-tricyanovinylaniline is collected on a filter. The solid is washed with cold 50% acetic acid and dried in vacuo at 80° C., yielding 79 parts (69%) of crystalline 4-tricyanovinylaniline, M. P. 196° C. A sample for analysis is recrystallized once from glacial acetic acid, M. P. 197–8° C. The light-absorption spectrum of an acetone solution of this compound shows a maximum absorption at 480 millimicrons, with a molecular extinction coefficient of 37,200.

*Analysis.*—Calculated for $C_{11}H_6N_4$: C, 68.0; H, 3.1; N, 28.9. Found: C, 67.69; H, 3.27; N, 28.69, 28.76.

Ten parts of this 4-tricyanovinylaniline are dissolved in 105 parts of glacial acetic acid containing 18 parts of concentrated sulfuric acid. A solution of 10 parts of sodium nitrite in 10 parts of water is slowly added at 15–20° C. The resulting yellow solution of the diazonium reaction product is poured slowly into a solution of 30 parts of beta-naphthol and 20 parts of sodium acetate in 790 parts of "2–B" ethanol. The solution immediately turns bright red in color and is warmed by the exothermic reaction. The mixture is cooled in an ice bath and rendered slightly alkaline (pH 8–10) by the addition of a cooled solution of 90 parts of sodium hydroxide in 1000 parts of water. The precipitate of 2-hydroxy-1-(4-tricyanovinylphenylazo)naphthalene that forms is collected by filtration, washed with water, and air-dried. The yield is 17 parts (98%) of blue-black crystals. A sample recrystallized from glacial acetic acid melts at 273–4° C. The light-absorption spectrum of a Cellosolve (2-ethoxyethanol) solution of this recrystallized compound shows a maximum absorption at 539 millimicrons with a molecular extinction coefficient of 36,600.

*Analysis.*—Calculated for $C_{11}H_{11}N_5O$: N, 20.6. Found: N, 20.50, 20.15.

EXAMPLE IV 4-tricyanovinylaniline, 10 parts, is slurried in a mixture of 105 parts of glacial acetic acid and 9 parts of concentrated sulfuric acid. A solution of 4 parts of sodium nitrite in 10 parts of water is slowly added. The reacting mixture is stirred for ten minutes after completing the addition and is kept at room temperature by external cooling if necessary. Excess nitrite is destroyed by adding a solution of 3 parts of sulfamic acid in 20 parts of water. Any traces of undissolved material are removed by filtration. To the resulting solution of 4-tricyanovinylbenzenediazonium sulfate is added a molecular equivalent of p-cresol (coupling compound) and the solution is rendered alkaline by adding an excess of ammonia. The dye, 2-hydroxy-5-methyl-1-(4-tricyanovinylphenylazo)benzene, separates as a dark colored precipitate and is collected by filtration, washed and dried as in Example III. A solution of this dye in acetic acid is yellow in color. A solution of it in pyridine is green. The light-absorption spectrum of a Cellosolve solution of the dye shows a maximum of absorption at 623 millimicrons.

The process of the last example was repeated using (in place of p-cresol) the coupling compounds indicated in the table below; distinguishing characteristics of product-color (in the solvents noted) and light-absorption maxima (in Cellosolve) of the products also appear in the table. Where two peaks were observed to be approximately equal, the table gives both values.

Table II

| Product | Name | Coupling Component | Solution Color | | Peak Absorption Wavelength (Millimicrons) |
|---|---|---|---|---|---|
| | | | Acetic Acid | Pyridine | |
| A | 2,4 - dihydroxy - 1 - (4 - tricyanovinylphenylazo)benzene. | resorcinol | red | brownish-red | 492 |
| B | 1,5 - dihydroxy - 4 - (4 - tricyanovinylphenylazo)naphthalene. | 1,5-dihydroxy-naphthalene | burgundy | blue-violet | 546 |
| C | ammonium 2 - hydroxy - 5 - (4 - tricyanovinylphenylazo)benzoate. | salicylic acid | yellow | green | 620 |
| D | ammonium 3 - hydroxy - 4 - (4 - tricyanovinylphenylazo)-2-naphthoate. | 3 - hydroxy - 2 - naphthoic acid. | red | blue-violet | 539, 617 |
| E | ammonium 1 - (4 - tricyanovinylphenylazo)-2-naphthol-6-sulfonate. | sodium 2 - naphthol - 6 - sulfonate. | orange-red | do | 548 |
| F | 1 - (4 - tricyanovinylphenylazo) - 2 - naphthol - 6 - sulfonamide. | 2-naphthol-6-sulfonamide | do | do | 542, 621 |
| G | ammonium 1 - (4 - tricyanovinylphenylazo)-2-naphthol-7-sulfonate. | 2-naphthol-7-sulfonic acid | red | violet | 542 |
| H | ammonium 1,8 - dihydroxy - 2 - (4 - tricyanovinylphenylazo)naphthalene - 3,6-disulfonate. | 1,8 - dihydroxy - naphthalene-3,6-disulfonic acid. | do | green | 580 |
| I | 4 - (4 - tricyanovinylphenylazo)-N-phenyl-aniline. | diphenylamine | violet | blue-violet | 400, 550 |
| J | N,N - di(beta - hydroxyethyl) - 4 - (4 - tricyanovinylphenylazo)aniline. | N,N-di(beta-hydroxyethyl) aniline. | burgundy | greenish-blue | 580 |
| K | N - ethyl - N - beta - hydroxyethyl - 4 - (4 - tricyanovinylphenylazo)-aniline. | N - ethyl-N-beta - hydroxyethyl-aniline. | violet | do | 590 |
| L | N,N - di(beta - hydroxyethyl) - 3 - methyl - 4-(4-tricyanovinyl-phenylazo)aniline. | N,N-di(beta-hydroxyethyl)-m-toluidine. | do | do | 435, 610 |
| M | 3 - hydroxy - 4 - (4 - tricyanovinylphenylazo)-2-naphthanilide. | 3-hydroxy-2-naphthanilide | orange-red | bluish-green | 582 |

Many other examples of the products of this invention will come readily to mind, depending upon the products chosen as the respective starting materials. Suitable tricyanovinylarylamines are not restricted to those specifically enumerated in the above-mentioned patent applications but broadly comprehend any aromatic compound carrying as substituents at least one primary amino group, at least one C-tricyanovinyl group, and optionally any of the auxochrome groups recognized above, remaining positions being filled by hydrogen or by hydrocarbon radicals, whether monovalent or doubly attached divalent. Preferably, the amino and tricyanovinyl substituents are located ortho or para to one another because these spacings have given the brightest and strongest colors, although those with meta spacing are not excluded from the scope of this invention.

Aromatic compounds suitable for coupling to diazotized tricyanovinylarylamines have at least one hydroxyl or primary, secondary, or tertiary amino substituent and replaceable hydrogen preferably ortho or para thereto, with remaining positions being occupied by other auxochrome substituents or by hydrogen or hydrocarbon radicals. Such coupling compounds include anilines, phenols, naphthylamines, naphthols, aminonaphthols, naphtholsulfonic acids, aminonaphtholsulfonic acids, anthrols, and anthrylamines, to mention but a few of the available arylamines and hydroxy compounds.

The diazotization reaction may be carried out conveniently at temperatures in the vicinity of room temperature or somewhat below; a temperature range of from about 0° C. to 25° C. is preferred. Examples of suitable solvents for the reaction are water, concentrated sulfuric acid, concentrated hydrochloric acid, glacial acetic acid, and N,N-dimethylformamide. One or more of these may be used in conjunction with another solvent, or two or more of these may be employed together. The preferred medium is a mixture of glacial acetic acid and concentrated sulfuric acid, particularly such a mixture in which the amount of sulfuric acid is slightly more than equivalent to the quantity of amine to be diazotized.

The coupling reaction may be carried out in water or in any of a wide variety of aqueous organic solutions or dispersions. Water-soluble alcohols, acetone, and pyridine are only a few examples of suitable organic solvents useful in the coupling medium. For rapid completion of the coupling reaction, the medium should be basic when the coupling compound is acidic but not when the compound is basic; thus a pH of 8 to 11 is preferred for the coupling medium when a hydroxy compound is to be coupled, and a pH of 4 to 7 when that compound is an amine.

The products of this invention are substantive as dyes upon a wide range of materials. In addition to the acetate textile mentioned in the examples, they are effective in dyeing leather and textiles made of the newer synthetic fibers, particularly those comprising polyesters, such as poly(ethyleneterephthalate).

The claimed invention:

1. Compound of formula

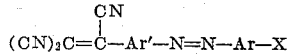

where Ar and Ar' are divalent carbocyclic aromatic radicals selected from the class consisting of arylene radicals which are exclusively hydrocarbon and auxochrome-substituted hydrocarbon arylenes, said auxochrome substituents being —Cl, —NRR', —NHR, —NH$_2$, —OR, —OH, —SO$_3$H and —COOH, where R and R' represent lower alkyl radicals, and X is from the group consisting of hydroxyl and amino radicals.

2. Compound of formula

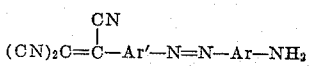

where Ar and Ar' are carbocyclic aromatic radicals selected from the class consisting of arylene radicals which are exclusively hydrocarbon and auxochrome-substituted hydrocarbon arylenes, said auxochrome substituents being —Cl, —NRR', —NHR, —NH$_2$, —OR, —OH, —SO$_3$H and —COOH, where R and R' represent lower alkyl radicals.

3. Compound of formula

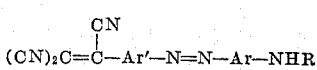

where Ar and Ar' are hydrocarbon arylene radicals and R is a lower alkyl radical.

4. Compound of formula

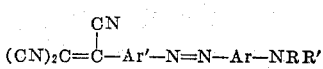

where Ar and Ar' are hydrocarbon arylene radicals and R and R' are lower alkyl radicals.

5. Compound of formula $$(CN)_2C=C(CN)-Ar'-N=N-Ar-OH$$

where Ar and Ar' are carbocyclic aromatic radicals selected from the class consisting of arylene radicals which are exclusively hydrocarbon and auxochrome-substituted hydrocarbon arylenes, said auxochrome substitutents being —Cl, —NRR', —NHR, —NH$_2$, —OR, —OH, —SO$_3$H and —COOH, where R and R' represent lower alkyl radicals.

References Cited in the file of this patent

UNITED STATES PATENTS

| | | |
|---|---|---|
| 2,471,959 | Hunt | May 31, 1949 |
| 2,676,953 | Ham | Apr. 27, 1954 |
| 2,717,261 | Krespan | Sept. 6, 1955 |
| 2,744,105 | Barney | May 1, 1956 |